(12) United States Patent  (10) Patent No.: US 8,326,443 B2
Nelson et al.  (45) Date of Patent: Dec. 4, 2012

(54) COMPUTER ENABLED METHOD FOR DISABLING PROTECTIVE SAFETY GEAR

(75) Inventors: Mark A. Nelson, Poughkeepsie, NY (US); Kevin H. Peters, Germantown, NY (US); Louis R. Ruggiero, Sandy Hook, CT (US)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 12/785,649

(22) Filed: May 24, 2010

(65) Prior Publication Data

US 2011/0288659 A1  Nov. 24, 2011

(51) Int. Cl.
*G05B 9/02* (2006.01)
*G05B 11/01* (2006.01)

(52) U.S. Cl. ............... 700/79; 700/21; 726/21; 382/181; 382/203; 382/312

(58) Field of Classification Search .................... 700/21, 700/79; 726/21; 382/181, 203, 312
See application file for complete search history.

(56) References Cited

U.S. PATENT DOCUMENTS

| | | | | |
|---|---|---|---|---|
| 5,015,086 A | * | 5/1991 | Okaue et al. | 351/44 |
| 5,023,597 A | * | 6/1991 | Salisbury | 340/573.4 |
| 5,164,707 A | * | 11/1992 | Rasmussen et al. | 340/551 |
| 5,442,168 A | * | 8/1995 | Gurner et al. | 463/36 |
| 5,508,511 A | * | 4/1996 | Zur et al. | 250/222.1 |
| 6,853,303 B2 | * | 2/2005 | Chen et al. | 340/573.1 |
| 7,401,918 B2 | * | 7/2008 | Howell et al. | 351/158 |
| 7,617,132 B2 | * | 11/2009 | Reade et al. | 705/26.61 |
| 8,094,807 B2 | * | 1/2012 | Ishibashi et al. | 379/399.01 |
| 2002/0196635 A1 | * | 12/2002 | DeVolpi | 362/464 |
| 2006/0115130 A1 | * | 6/2006 | Kozlay | 382/117 |
| 2009/0147215 A1 | * | 6/2009 | Howell et al. | 351/158 |

OTHER PUBLICATIONS

Kazuhiro Hotta; A Robust Face Detector Under Partial Occlusion; 2004 International Conference on Image Processing (ICIP); 0-7803-8554-3/94 copyright 2004 IEEE; pp. 597-600.

Sang-Ki Kim et al.; Face Recognition Incorporating Ancillary Information; Hindawi Publishing Corporation, EURASIP Journal on Advances in Signal Processing, vol. 2008, Article ID 312849, 11 pages, doi:10.1155/2008/312849.

Arai et al.; Communication Aid with Human Eyes Only; IEEJ Transactions on Electronics, Information and Systems, vol. 128, Issue 11, p. 12.

* cited by examiner

*Primary Examiner* — Ramesh Patel

(74) *Attorney, Agent, or Firm* — Schmeiser, Olsen & Watts; Anna Linne

(57) ABSTRACT

An apparatus control method and system. The method includes disabling by a computer processor of a computing system, an apparatus. The computer processor retrieves detection data, safety gear detection data, and safety gear indication data. The computer processor analyzes the detection data, the safety gear detection data, and the safety gear indication data and in response to results of the analysis, the computer processor enables the apparatus.

24 Claims, 3 Drawing Sheets

COMPUTER ENABLED METHOD FOR DISABLING PROTECTIVE SAFETY GEAR

FIELD OF THE INVENTION

The present invention relates to a method and associated system for enabling and disabling an apparatus based on a user and associated protective gear.

BACKGROUND OF THE INVENTION

Securing an apparatus typically comprises an inefficient process with little flexibility. An apparatus is typically activated without any regard to potential issues. Using an apparatus without any regard to potential issues may result in user safety issues.

SUMMARY OF THE INVENTION

The present invention provides a method comprising: disabling, by a computer processor of a computing system, an apparatus; retrieving, by the computer processor from a detection device, first detection data indicating that a first individual is located within a specified proximity of the apparatus; retrieving, by the computer processor from the detection device, first safety gear detection data indicating that the first individual is correctly wearing first specified protective gear; retrieving, by the computer processor from the detection device, first safety gear indication data indicating that the first specified protective gear comprises a first unique marking indicating a correct type of protective gear associated with the first specified protective gear and using the apparatus; analyzing, by the computer processor, the first detection data, the first safety gear detection data, and the first safety gear indication data; and enabling, by the computer processor in response to results of the analyzing, the apparatus.

The present invention provides a method comprising: disabling, by a computer processor of a computing system, an apparatus such that the apparatus is in an inoperable state; retrieving, by the computer processor from a detection device, first detection data indicating that a first individual is located within a specified proximity of the apparatus; retrieving, by the computer processor from the detection device, first safety gear detection data indicating that the first individual is not wearing first specified protective gear; analyzing, by the computer processor, the first detection data and the first safety gear detection data; and generating, by the computer processor in response to results of the analyzing, a report indicating that the apparatus will remain in the inoperable state.

The present invention advantageously provides a simple method and associated system capable of securing an apparatus.

DETAILED DESCRIPTION OF THE INVENTION

Figure 1:
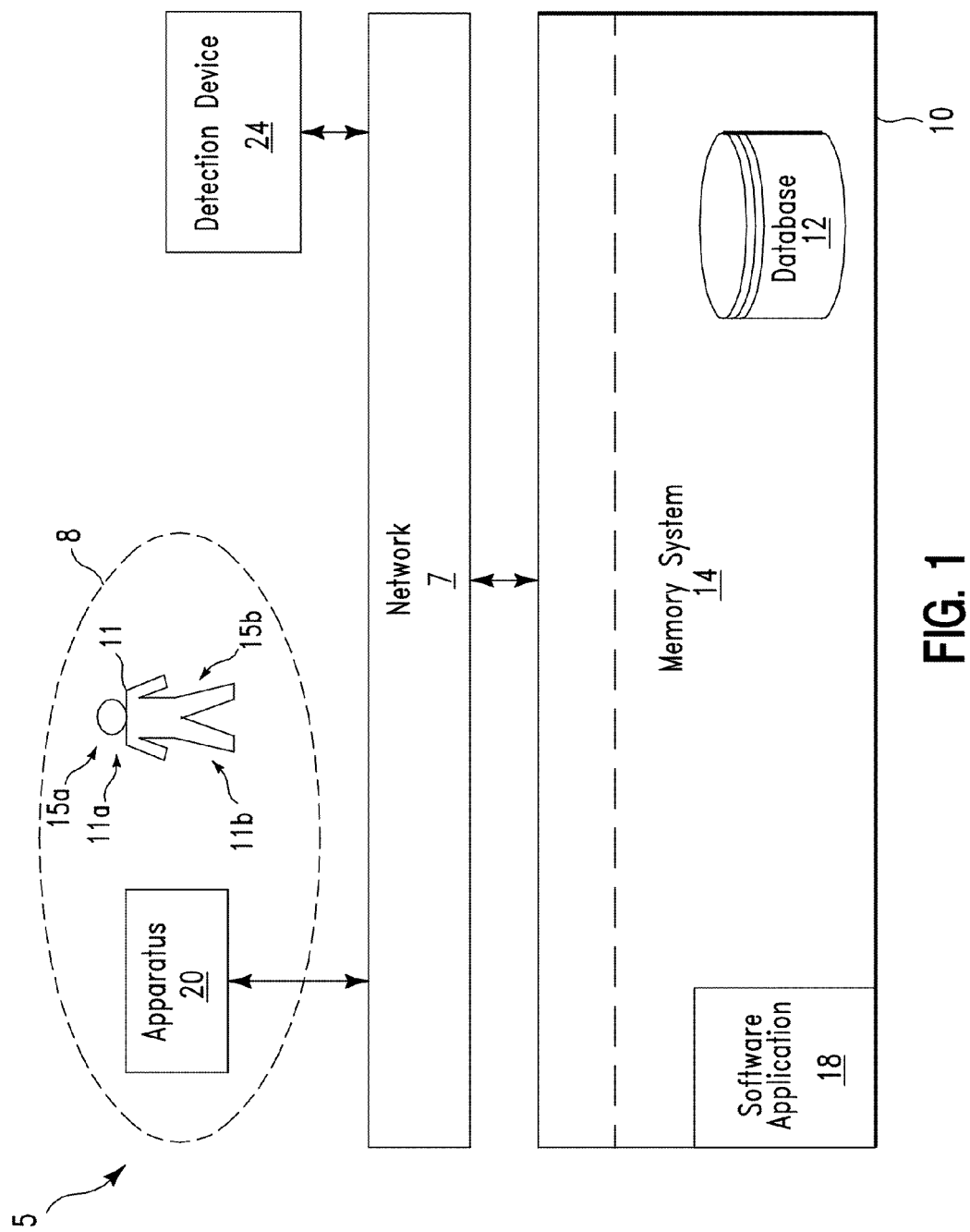
FIG. 1 illustrates a system for enabling or disabling an apparatus based on detection of protective gear correctly worn by a user, in accordance with embodiments of the present invention.

FIG. 1 illustrates a system 5 for enabling or disabling an apparatus 20 based on detection of protective gear 15a and/or 15b correctly worn by a user 11 of apparatus 20, in accordance with embodiments of the present invention. Apparatus 20 may comprise any electro/mechanical device requiring a user to wear protective gear. For example, apparatus 20 may comprise, inter alia, a saw, a drill, welding equipment, laboratory equipment, chemical equipment, machine shop equipment, automotive repair equipment, etc. Protective gear 15a may include any protective gear for protection a head/face area 11a of user 11 such as, inter alia, safety eyewear, respiratory equipment, etc. Protective gear 15b may include any protective gear for protection a body area 11b of user 11 such as, inter alia, body protective gear (e.g., gloves, boots, fall protection, etc), etc. System 5 retrieves data from a manufacturer of apparatus 20 or any other authorized source (e.g., safety representative). The data documents the use of apparatus 20 and/or any required safety equipment (i.e., for user 11) necessary for operation. Apparatus 20 may comprise a setting dial for multiple uses. The multiple uses for apparatus 20 may require specified types and/or levels of protective gear 15a or 15b required (i.e., for user 11) for operation of apparatus 20. Therefore, system 5 enables a process for detecting required safety equipment markings on one or more safety devices (e.g., protective gear 15a and 15b). System 5 ensures user 11 (and/or additional users or bystanders) is correctly wearing one or more safety devices by sensing an appropriate safety equipment rating label within a unique zone (i.e., on user 11) for each safety device (e.g., based on a position in relation to users head/body or a facial recognition program). Additionally, system 5 enables a process for determining that user 11 is wearing one or more safety devices properly (e.g., safety glasses over the user's 11 eyes). The aforementioned process may be performed by detecting a specified zone on the user. The specified zone may be determined by, inter alia, a triangulation process, a radar/optical process, etc.

System 5 of FIG. 1 comprises apparatus 20 and detection device 24 connected through a network 7 to a computing system 10. Alternatively, apparatus 20 and detection device 24 may be directly connected to computing system 14 without network 7. Detection device 24 may comprise any type of detection device capable of detecting:

1. Detecting that user 11 is located within a specified proximity 8 (or area) of apparatus 20.
2. Detecting that user 11 is correctly wearing any specified protective gear 15a and/or 15b (e.g., safety glasses are being worn over the user's eyes as opposed to being placed on the user's head).
3. Detecting that specified protective gear 15a and/or 15b includes unique markings indicating a correct type of protective gear associated with operating apparatus 20.
4. Detecting that the user is facing a proper direction with respect to apparatus 20 (e.g., the user is looking at operating apparatus 20 as opposed to looking away from apparatus 20).
5. Detecting a user and/or bystander position with respect to apparatus 20.

Detection device 24 may comprise, inter alia, a camera or any other type of optical device, etc. Network 7 may comprise any type of network including, inter alia, a local area network, (LAN), a wide area network (WAN), the Internet, etc. Computing system 10 may comprise any type of computing system(s) including, inter alia, a personal computer (PC), a server computer, a database computer, a controller, etc. Computing system 10 comprises a memory system 14. Memory system 14 may comprise a single memory system. Alternatively, memory system 14 may comprise a plurality of memory systems. Memory system 14 comprises a software application 18 and a database 12. Database 12 comprises all retrieved detection and indication data and any log data. Software application 18 enables a method to:

1. Automatically detect if one or more people (e.g., user 11) have (optionally marked) protective gear 15a and/or 15b and are wearing them properly (i.e., on a proper location/unique zone on user 11). For example, software application 18 may automatically detect if user 11 is wearing safety glasses in front of their eyes as opposed to on top of their forehead.
2. Automatically detect if one or more people have recently put on or taken off protective gear 15a and/or 15b.
3. Enable an automatic safety (e.g., an off switch, a disengage clutch, etc) that prevents apparatus 20 from being operated until user 11 has placed uniquely marked protective gear 15a and/or 15b in a proper location.
4. Automatically detect if one or more people is wearing a correct level of protective gear 15a and/or 15b.
5. Automatically detect if another person besides an operator of apparatus 20 is in close proximity to apparatus 20 and if detected engage a safety mechanism to disable apparatus 20 until the other person is no longer in close proximity to apparatus 20 thereby preventing distractions.
6. Automatic detection to ensure that user 11 is located in a correct (i.e., approved) position with respect to apparatus (e.g., not behind apparatus 20) and enabling of a safety mechanism to enable or disable apparatus 20 if user 11 is located in an incorrect position with respect to apparatus 20.
7. Enable a facial recognition process to validate proper protective gear is marked correctly.

Protective gear 15a and/or 15b may optionally be marked with a rating label based on different classes and level of protection within that class. For example, safety glasses may be marked with a class rating label of welding and a level of protection comprising a specified tint level. System 5 may use a facial recognition process to ensure that protective gear 15a and/or 15b are on user 11 and then use an optical character recognition (OCR) process to recognize the makings on protective gear 15a and/or 15b. If the marking of protective gear 15a and/or 15b being worn is equal to or greater than a type required, continued use of the apparatus 20 is allowed. Otherwise computing system 10 enables a safety device (e.g., to disable power to or a mechanical portion of apparatus) in order to disables operation.

System 5 may comprise the following components as described, infra:

1. An apparatus/machine to be operated. For example, apparatus 20 (i.e., of FIG. 1) requiring the use of protective gear 15a and/or 15b.
2. Protective gear. For example, protective gear 15a and/or 15b such as, inter alia, eye protection (e.g., glasses/safety glasses, goggles, shields, etc), body protection, etc. As an example, eye protection gear may be marked with a rating label (i.e., based on different classes and levels of eye protection within a class). The rating label may be granular enough to distinguish a type of machine/environment, tint, fog prevention, anti-static, etc. The rating label may be included as part of a manufacturing process (painted, imprinted, etched, permanent label, etc) for the protective gear. Alternatively, existing safety glasses may be retrofitted with an eye protection rating level label verified by local safety team.
3. An image capture device such as detection device 24. For example, the image capture device may be a camera. The image capture device may be built into a machine or alternatively may be a part of a stand-alone device. The image capture device may comprise a plurality of image capture devices to monitor an area to determine if all individuals in an area are wearing proper protective gear (e.g., eyewear). The image capture device(s) may control a single or multiple safety devices. A position of the image capture device may determine a viewing angle and may be used to ensure that an operator of the apparatus/machine is in a proper (approved) working position to use the apparatus/machine. For example, in order to use a table saw, a user should be in front of the table saw (not behind the table saw) so the image capture device may be mounted to face forward. Additionally, additional portions of the protective gear (e.g., shields around the lenses) may be used to limit a field of view.
4. Recognition component of computing system 10 such as software application 18. The recognition component may be enabled to determine if a user's face is present and if he/she is wearing correct protective gear. In order to determine if the correct protective gear is being worn, optical character recognition code may be used to examine an image provided by the image capture device. The optical character recognition code will examine only an area of the user that is within a zone for the associated protective gear in order to determine if a required (or greater than a required) safety rating is present. If the safety rating of the protective gear being worn is equal to or greater than the safety rating needed by the apparatus/machine, the recognition component enables an operation of the apparatus/machine otherwise the apparatus/machine is put into an inoperable state. Additionally, the recognition component may be coded to recognize safety hats and masks as a face and to determine if the mask is in a correct position to protect a user's eyes. In order to associate a hat with a face, facial recognition code could find a body of a user using a facial recognition technique to detect/anticipate movement and occlusion. System 5 could then look for a safety rating in a specific eye zone based on a position of the body. If the mask is tilted up, a safety rating code will not be in the correct position to be detected and therefore the apparatus/machine may be put into an inoperable state. Additionally, authentication of a user identity may be required. Identifying a user allows detailed auditing of successful and unsuccessful use of an apparatus/machine and may be used to update safety and insurance records. The recognition component may be enabled to determine and/or generate the following:

A. A required level of safety equipment: A proper level of safety equipment may be determined based on equipment and environment. A specific level of safety equipment may be determined and required by country, state and/or company policies.
   B. Facial profiles: In order to identify users for audit records or to compare against training, facial scans may be performed and results may be stored in a database (e.g., database 12). The facial profiles may be stored as, inter alia, a picture, an algorithmic extraction, etc. Additionally, the facial profiles may also be associated with a name and/or serial number.
   C. Programmatic actions: Programmatic actions may be enabled to disable an operation of the apparatus/machine. The programmatic actions may enable a safety switch thereby eliminating current, disabling a clutch, inserting a blocking mechanism, etc. Programmatic actions may comprise a recovery action (i.e., to reactive operation of the apparatus/machine). Data identifying the recovery action may be stored for future reference. Programmatic actions may be state driven. For example, a first programmatic action when starting an apparatus/machine will not allow starting and will cause an indicator light to blink and a second programmatic action (i.e., if the apparatus/machine is already in use) may cause a safety block to drops in place (i.e., to disable the apparatus/machine).

D. Audit records: Audit records may be generated at various levels (e.g., a number of violations, users that violated policies, a time/date of violations, etc). The audit records may be used to validate adherence to governmental and corporate safety regulations and to reduce a price of an insurance policy. An optical image could be captured into memory when person violates safety policies, as a different means of enforcement, if a full facial recognition program is not enabled. The images could be accessed by a local safety representative to handle.

5. Safety device(s) comprising a mechanism for disabling and enabling a use of an apparatus/machine (e.g., a switch (e.g., a relay, a contactor, etc), an engage clutch, a safety shield lowered to prevent use, etc). The safety device(s), computing system 10 (comprising the recognition component), and the image capture device (i.e., detection 24 device) may be integrated into the apparatus/machine. Alternatively, the safety device(s), computing system 10 (comprising the recognition component), and the image capture device (i.e., detection 24 device) may be a stand-alone unit comprising computing system 10 and the image capture device contained in a device and connected to the apparatus/machine by hardwiring into electrical connections or as a switchable plug connection between an electrical cord and an outlet.

6. Optional output devices: Computing system 10 may enable requests (i.e., for signaling that the apparatus/machine has or will be put into an inoperable state due to lack of/or incorrect positioning of protective gear 15a and/or 15b) to output devices such as, inter alia:

A. Speakers broadcasting a tone or audio/MP3/WAV message.

B. Lights that change colors or that flash.

C. Display device(s) that present error messages and/or codes. The error messages and/or codes may be transmitted using various techniques such as SMS messaging/text or note to a manager, etc.

The following implementation example for enabling or disabling an apparatus (i.e., via a safety device) such as a saw based on detection of protective gear correctly worn by a user of the apparatus is described as follows based on the following scenario:

There are two classes of safety glasses: A basic pair of safety of glasses marked with the alpha/numeric code "BASIC" and a high impact pair of safety glasses marked with the alpha/numeric code "z287+". The apparatus to be operated requires the use of high impact safety glasses. The safety device comprises a safety bar that when lowered disables the apparatus. The following steps describe the implementation example:

1. An operator approaches the apparatus without wearing safety glasses.
2. The operator pushes a start button for the apparatus.
3. The apparatus starts (i.e., powers on) but a safety bar stays in a lowered inoperable position. Additionally, an announcement broadcasted via a speaker states the following message "This machine requires the operator to wear high impact z287+ safety glasses".
4. The operator puts on a pair of "Basic" safety glasses and tries to use the apparatus.
5. The apparatus stays in inoperable mode and an announcement broadcasted via the speaker states the following message "This machine requires the operator to wear high impact z287+ Safety Glasses".
6. The operator takes off the "Basic" safety glasses and puts on a pair of high impact z287+ Glasses.
7. The safety bar automatically raises and the apparatus becomes fully operational.
8. The operator reaches for some material outside a camera (i.e., a detection device) range.
9. The safety bar automatically lowers to place the apparatus in inoperable mode.
10. The operator returns to the camera viewing area (i.e., still wearing the high impact safety glasses) and the safety bar is raised (machine is fully operational).
11. The operator removes the high impact safety glasses to rub his/her eyes.
12. The apparatus lowers the safety bar and the apparatus becomes inoperable.
13. The operator puts the high impact safety glasses back on and the apparatus becomes operable.
14. The operator turns the apparatus off since he/she has finished using the apparatus and the safety bar lowers to the inoperable position.

Figure 2:
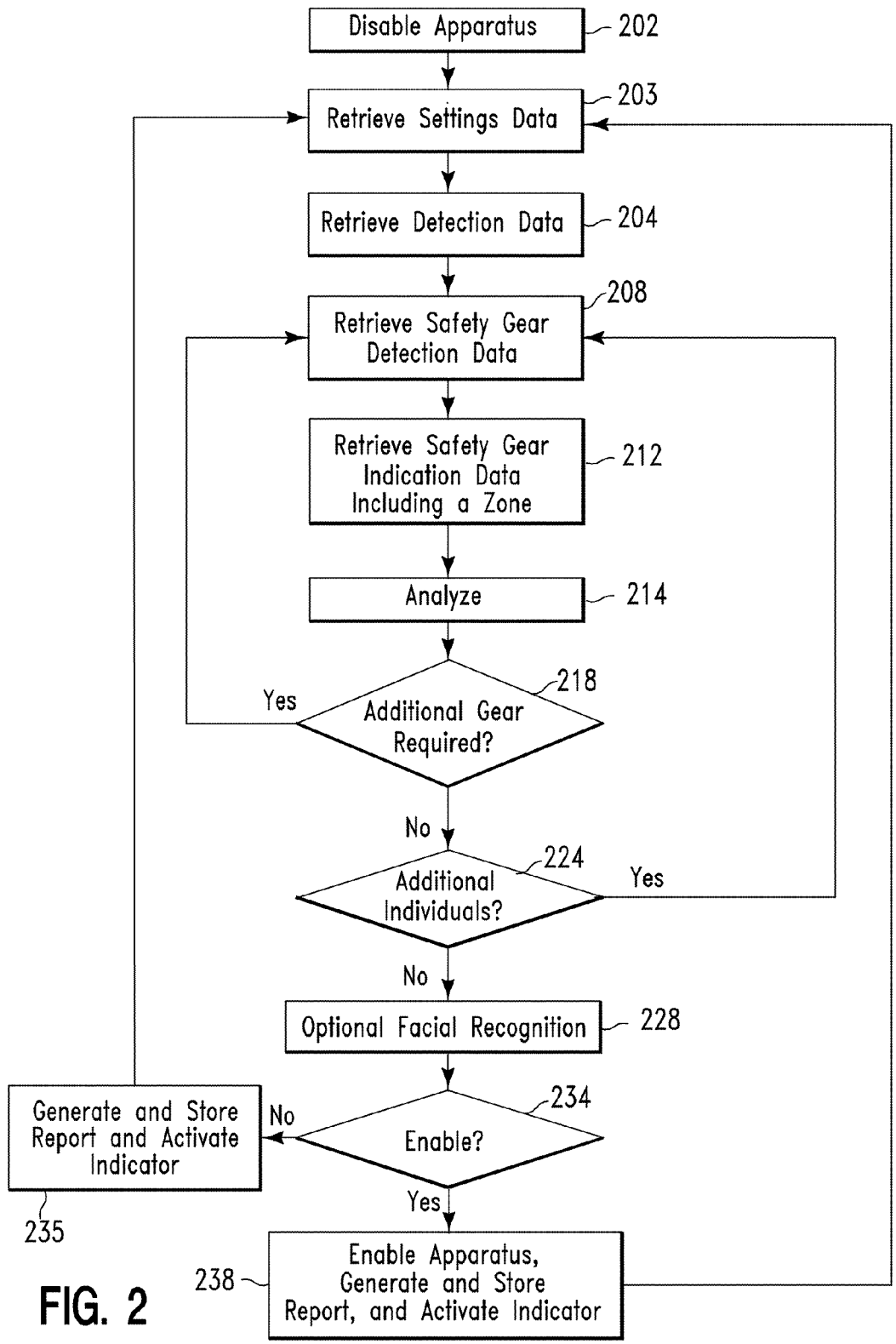
FIG. 2 illustrates a flowchart describing an algorithm used by the system of FIG. 1 for enabling or disabling an apparatus based on detection of protective gear correctly worn by a user, in accordance with embodiments of the present invention.

FIG. 2 illustrates a flowchart describing an algorithm used by system 5 of FIG. 1 for enabling or disabling an apparatus based on detection of protective gear correctly worn by a user of the apparatus, in accordance with embodiments of the present invention. In step 202, a computer processor of a computing system (e.g., computing system 10 of FIG. 1) disables an apparatus (e.g., apparatus 20 of FIG. 1). In step 203, the computer processor retrieves settings data associated with a specified setting for the apparatus. The settings data determines a list of required safety gear and a required minimal level (i.e., a unique marking) for each piece of safety gear. For example, changing a setting on a welding machine may require a change of safety gear (e.g., a darker tint of lens). In step 204, a detection device (e.g., detection device 24 of FIG. 1) detects that an individual is located within a specified proximity (e.g., within proximity 8 of FIG. 1) of the apparatus and the computer processor retrieves (i.e., from the detection device) detection data indicating that the individual is located within the specified proximity of the apparatus and the computer processor retrieves (i.e., from the detection device) detection data indicating that the individual is located within the specified proximity of the apparatus. In step 208, the computer processor retrieves (i.e., from the detection device) safety gear detection data (i.e., comprising a safety minimum rating or greater for this type of safety gear) indicating that the individual is correctly wearing the specified safety gear. In step 212, the detection device detects that the specified protective gear comprises a unique marking indicating a correct type of protective gear associated with the specified protective gear and using the apparatus and the computer processor retrieves (from the detection device) safety gear indication data indicating that the specified protective gear comprises a the unique marking. This may be accomplished by retrieving an associated zone and within the zone examining an optical image for specified safety gear and optically recognizable characters (OCR). In step 214, the computer processor analyzes the detection data (safety gear detection data from step 208) and compares the detection data to any OCR unique marking found within the zone. (e.g., the first safety gear detection data, and the safety gear indication data). If an OCR marking is not found or if the marking is not in the data acquired in step 208, the missing safety equipment is noted in temporary storage space for use with step 235 as described, infra. In step 218, the computer processor determines (based on results of the analysis of step 214 and additional supplied safety data for the apparatus) if the individual is required to wear any additional protective gear associated with operation of the apparatus. If in step 218, the computer processor determines that the individual is required to wear additional protective gear associated with operation of the apparatus then step 208 is repeated to detect the additional protective gear. If in step 218, the computer processor determines that the individual is not required to wear additional protective gear associated with operation of the apparatus then in step 224, the computer processor determines if additional individuals are located within the specified proximity of the apparatus. If in step 224, the computer processor determines that additional individuals are located within the specified proximity of the apparatus then step 208 is repeated to detect that the additional individual(s) is correctly wearing specified protective gear. If in step 224, the computer processor determines that additional individuals are not located within the specified proximity of the apparatus then in step 228, the computer processor enables an optional facial recognition process of the individual in order to determine an identity of the individual. In step 234, the computer processor determines (i.e., based on results of steps 214, 228, and 232) if the apparatus will be enabled for operation. If in step 234, the computer processor determines that the apparatus will not be enabled for operation then in step 235, the computer processor generates a report indicating: that the apparatus has not been enabled; a reason why the apparatus has not been enabled (e.g., incorrect protective gear); and an identity of the individual. Additionally, an indicator (an alarm) may be activated. After step 235 has completed, step 203 is repeated. If in step 234, the computer processor determines that the apparatus will be enabled for operation then in step 238, the computer processor enables the apparatus and generates a report indicating: that the apparatus has been enabled and an identity of the individual. Additionally, an indicator (an alarm) may be activated and/or an image of the violator(s) may be captured and stored for later retrieval. After step 238 has completed, step 203 is repeated to detect the same individual or additional individuals.

Figure 3:
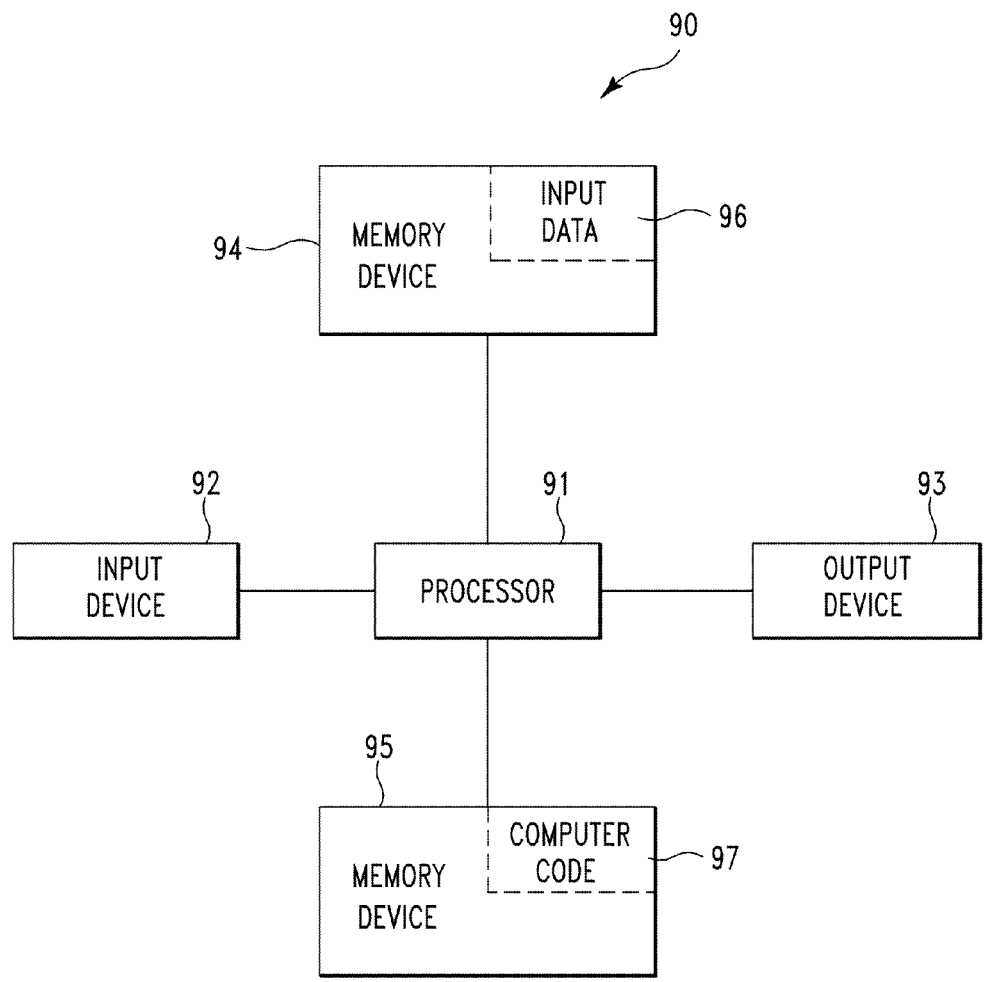
FIG. 3 illustrates a computer apparatus used for enabling or disabling an apparatus, in accordance with embodiments of the present invention.

FIG. 3 illustrates a computer apparatus 90 (e.g., computing system 10 of FIG. 1) used for enabling or disabling an apparatus based on detection of protective gear correctly worn by a user of the apparatus, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for enabling or disabling an apparatus based on detection of protective gear correctly worn by a user of the apparatus. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service provider who offers to enable or disable an apparatus based on detection of protective gear correctly worn by a user of the apparatus. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for enabling or disabling an apparatus based on detection of protective gear correctly worn by a user of the apparatus. In another embodiment, the invention provides a method that performs the process steps of the invention on a subscription, advertising, and/or fee basis. That is, a service provider, such as a Solution Integrator, could offer to enable or disable an apparatus based on detection of protective gear correctly worn by a user of the apparatus. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method comprising the steps of:
    disabling, by a computer processor of a computing system, an apparatus;
    retrieving, by said computer processor from a detection device, comprising a video retrieval device, first detection data indicating that a first individual is located within a specified proximity of said apparatus;
    retrieving, by said computer processor from said detection device, first safety gear detection data indicating that said first individual is correctly wearing first specified protective gear;
    retrieving, by said computer processor from said detection device, first safety gear indication data indicating that said first specified protective gear comprises a first unique marking indicating a correct type of protective gear associated with said first specified protective gear and using said apparatus, wherein said first unique marking further indicates a specified classes of said first specified protective gear and a specified protection level within said specified class;

performing, by said computer processor, an optical character recognition process associated with said first unique marking, wherein results of said optical character recognition process results in decoding said first unique marking;

analyzing, by said computer processor, said first detection data, said first safety gear detection data, said first safety gear indication data, and said results of said optical character recognition process;

performing by said computer processor, a facial recognition process of said first individual;

first determining, by said computer processor in response to results generated during said performing said facial recognition process that said first specified protective gear is located within a specified unique zone on said first individual; and enabling, by said computer processor in response to results of said analyzing, and said first determining, said apparatus.

2. The method of claim 1, further comprising:
retrieving, by said computer processor from said detection device, second safety gear detection data indicating that said first specified protective gear has been removed from said first individual; and
disabling, by said computer processor in response to analyzing said second safety gear detection data, said apparatus.

3. The method of claim 1, wherein said unique marking further indicates a correct level of protection associated with said first specified protective gear and said using said apparatus.

4. The method of claim 1, further comprising:
retrieving, by said computer processor from said detection device, second detection data indicating that a second individual is located within said specified proximity of said apparatus; and
disabling, by said computer processor in response to analyzing said second detection data, said apparatus.

5. The method of claim 1, further comprising:
retrieving, by said computer processor from said detection device, position data indicating that said first individual has moved to an unapproved location with respect to said apparatus; and
disabling, by said computer processor in response to analyzing said position data, said apparatus.

6. The method of claim 1, wherein said analyzing said first safety gear indication data comprises:
validating, by said computer processor in response to said results generated during said facial recognition process, that said first unique marking comprises a correct marking.

7. The method of claim 1, further comprising:
determining, by said computer processor based on a type of said apparatus, that said first individual is required to wear additional specified protective gear;
retrieving, by said computer processor from said detection device, second safety gear detection data indicating that said first individual is correctly wearing second specified protective gear associated with said additional specified protective gear;
retrieving, by said computer processor from said detection device, second safety gear indication data indicating that said second specified protective gear comprises a second unique marking indicating a correct type of protective gear associated with said second specified protective gear and using said apparatus; and
second analyzing, by said computer processor, said second safety gear detection data and said second safety gear indication data, wherein said enabling is in further response to result of said second analyzing.

8. The method of claim 1, further comprising:
retrieving, by said computer processor from said detection device, second detection data indicating that a second individual is located within said specified proximity of said apparatus;
retrieving, by said computer processor from said detection device, second safety gear detection data indicating that said second individual is correctly wearing second specified protective gear comprising a same type of protective gear as said first specified protective gear;
retrieving, by said computer processor from said detection device, second safety gear indication data indicating that said second specified protective gear comprises a second unique marking indicating a correct type of protective gear associated with said second specified protective gear and using said apparatus;
second analyzing, by said computer processor, said second detection data, said second safety gear detection data, and said second safety gear indication data; and
confirming, by said computer processor in response to results of said second analyzing, said enabling of said apparatus.

9. The method of claim 1, further comprising:
retrieving, by said computer processor from said detection device, second detection data indicating that a second individual is located within said specified proximity of said apparatus;
determining, by said computer processor based on said second detection data, a specified distance between said second individual and said apparatus;
determining, by said computer processor based on said specified distance, second specified protective gear to be worn by said second individual;
retrieving, by said computer processor from said detection device, second safety gear detection data indicating that said second individual is correctly wearing said second specified protective gear;
retrieving, by said computer processor from said detection device, second safety gear indication data indicating that said second specified protective gear comprises a second unique marking indicating a correct type of protective gear associated with said second specified protective gear and using said apparatus;
second analyzing, by said computer processor, said second detection data, said second safety gear detection data, and said second safety gear indication data; and
confirming, by said computer processor in response to results of said second analyzing, said enabling of said apparatus.

10. The method of claim 9, wherein said second specified protective gear comprises a same type of protective gear as said first specified protective gear.

11. The method of claim 9, wherein said second specified protective gear differs from said first specified protective gear.

12. The method of claim 1, further comprising:
retrieving, by said computer processor, setting data indicating that a setting associated with an operation of said apparatus has been changed resulting in a modified setting;
disabling, by said computer processor in response to analyzing said setting data, said apparatus;

determining, by said computer processor based on said analyzing said setting data, second specified protective gear to be worn by said first individual;

determining, by said computer processor, that said first individual has removed said first specified protective gear;

retrieving, by said computer processor from said detection device, second safety gear detection data indicating that said second individual is correctly wearing said second specified protective gear;

retrieving, by said computer processor from said detection device, second safety gear indication data indicating that said second specified protective gear comprises a second unique marking indicating a correct type of protective gear associated with said second specified protective gear and using said apparatus at said modified setting;

second analyzing, by said computer processor, said second safety gear detection data and said second safety gear indication data; and enabling, by said computer processor in response to results of said analyzing said setting data and said second analyzing, said apparatus.

13. The method of claim 1, further comprising:

retrieving, by said computer processor, setting data indicating a setting associated with an operation of said apparatus; and second analyzing, by said computer processor, said setting data, wherein said enabling is further in response to results of said second analyzing.

14. The method of claim 1, further comprising:

determining, by said computer processor based on results of said facial recognition process, an identity of said first individual; and generating, by said computer processor, a report indicating said identity of said first individual and that said first individual has complied with safety regulations associated with said first specified protective gear and said using said apparatus.

15. The method of claim 1, wherein said enabling said apparatus comprises enabling an incoming power source for said apparatus.

16. The method of claim 1, wherein said enabling said apparatus comprises enabling an electro/mechanical device required for operation of said apparatus.

17. The method of claim 1, wherein said first specified protective gear comprises safety gear selected from the group consisting of safety eyewear, safety respiratory equipment, and safety body protective gear.

18. The method of claim 1, further comprising:

providing at least one support service for at least one of creating, integrating, hosting, maintaining, and deploying computer-readable code in said computing system, wherein the code in combination with the computing system is capable of performing: said disabling, said retrieving said first detection data, said retrieving said first safety gear detection data, said retrieving said first safety gear indication data, said analyzing, and said enabling.

19. The method of claim 1, further comprising:

providing a computer program product, comprising a computer storage medium comprising a computer readable program code embodied therein, wherein said computer readable program code is configured to perform: said disabling, said retrieving said first detection data, said retrieving said first safety gear detection data, said retrieving said first safety gear indication data, said analyzing and said enabling.

20. The method of claim 1, further comprising:

providing a computing system, comprising said computer processor coupled to a computer-readable memory unit, said memory unit comprising instructions that when enabled by said computer processor implement a method comprising: said disabling, said retrieving said first detection data, said retrieving said first safety gear detection data, said retrieving said first safety gear indication data, said analyzing and said enabling.

21. A method comprising the steps of:

disabling, by a computer processor of a computing system, an apparatus such that said apparatus is in an inoperable state;

retrieving, by said computer processor from a detection device comprising a video retrieval device, first detection data indicating that a first individual is located within a specified proximity of said apparatus;

determining, by said computer processor based on images of said first individual captured by said video retrieval device, that said first individual is in an approved working position with respect to said apparatus, wherein said approved working position comprises said first individual facing a specified direction with respect to said apparatus;

performing, by said computer processors executing said video retrieval device, a facical recognition process of said first individual;

first determining, by said computer processor in response to results generated during said performing said facial recognition process, that first specified protective gear is not located within a specified unique zone on said first individual;

retrieving, by said computer processor from said detection device, first safety gear detection data indicating that said first individual is not wearing said first specified protective gear;

analyzing, by said computer processor, said first detection data and said first safety gear detection data; and generating, by said computer processor in response to results of said analyzing, a report indicating that said apparatus will remain in said inoperable state.

22. The method of claim 21, further comprising:

performing, by said computer processor, a facial recognition process of said first individual; and determining, by said computer processor based on results of said facial recognition process, an identity of said first individual, wherein said report indicates said identity of said first individual.

23. The method of claim 21, further comprising:

generating, by said computer processor, an alarm signal indicating that said apparatus will remain in said inoperable state; and enabling said alarm signal.

24. The method of claim 21, wherein said report further indicates that said first individual is not wearing said first specified protective gear, and wherein said method further comprises:

retrieving, by said computer processor from said detection device, an optical image of said first individual; and transmitting, by said computer processor to a safety representative, said report and said optical image.

* * * * *